(12) United States Patent
Lenhardt

(10) Patent No.: US 12,331,204 B2
(45) Date of Patent: Jun. 17, 2025

(54) TRANSPARENT 3D PRINTED SILOXANE ELASTOMERS

(71) Applicant: Lawrence Livermore National Security, LLC, Livermore, CA (US)

(72) Inventor: Jeremy M. Lenhardt, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1041 days.

(21) Appl. No.: 17/075,549

(22) Filed: Oct. 20, 2020

(65) Prior Publication Data

US 2022/0119657 A1   Apr. 21, 2022

(51) Int. Cl.
| | |
|---|---|
| C09D 11/00 | (2014.01) |
| B29C 64/129 | (2017.01) |
| B33Y 70/10 | (2020.01) |
| C08G 77/04 | (2006.01) |
| C08K 3/36 | (2006.01) |
| C09D 11/102 | (2014.01) |
| B29K 83/00 | (2006.01) |
| B33Y 10/00 | (2015.01) |
| B33Y 80/00 | (2015.01) |

(52) U.S. Cl.
CPC .......... *C09D 11/102* (2013.01); *B29C 64/129* (2017.08); *B33Y 70/10* (2020.01); *C08G 77/04* (2013.01); *C08K 3/36* (2013.01); *B29K 2083/00* (2013.01); *B33Y 10/00* (2014.12); *B33Y 80/00* (2014.12)

(58) Field of Classification Search
CPC ..... C09D 11/102; B29C 64/129; B33Y 70/10; B33Y 10/00; B33Y 80/00; C08G 77/04; C08K 3/36; B29K 2083/00

USPC .......................................... 106/31.01, 31.13
See application file for complete search history.

(56) References Cited

U.S. PATENT DOCUMENTS

| | | | |
|---|---|---|---|
| 4,418,165 | A | 11/1983 | Polmanteer et al. |
| 6,559,199 | B1 | 5/2003 | Pusineri et al. |
| 6,942,830 | B2 | 9/2005 | Mulhaupt et al. |
| 8,333,946 | B2 | 12/2012 | Gottschalk-Gaudig et al. |
| 10,689,491 | B2 | 6/2020 | Durban et al. |
| 2007/0287771 | A1 | 12/2007 | Yamazaki et al. |
| 2008/0033071 | A1 | 2/2008 | Irmer et al. |
| 2009/0018260 | A1 | 1/2009 | Correia et al. |
| 2009/0062417 | A1 | 3/2009 | Wrobel et al. |
| 2010/0239871 | A1 | 9/2010 | Scheffer et al. |

(Continued)

FOREIGN PATENT DOCUMENTS

| | | |
|---|---|---|
| EP | 1433749 A1 | 6/2004 |
| WO | 2017044735 A1 | 3/2017 |

(Continued)

OTHER PUBLICATIONS

International Search Report and Written Opinion from PCT Application No. PCT/US2021/049725, dated Dec. 28, 2021.

(Continued)

*Primary Examiner* — James E McDonough
(74) *Attorney, Agent, or Firm* — Zilka-Kotab, P.C.

(57) ABSTRACT

An ink includes a siloxane polymer having at least 13 mol. % diphenylsiloxane content relative to the total mol. % of the siloxane polymer, and a filler having a refractive index about matching a refractive index of the siloxane polymer where the refractive indices are within about 5% of one another but are ideally as closely matched as possible.

20 Claims, 7 Drawing Sheets

(56) References Cited

U.S. PATENT DOCUMENTS

| | | |
|---|---|---|
| 2013/0200554 A1 | 8/2013 | Mueller |
| 2013/0245181 A1 | 9/2013 | Friedel et al. |
| 2014/0046191 A1* | 2/2014 | Anker .................. A61B 5/1127 600/407 |
| 2014/0356590 A1 | 12/2014 | Hoffee et al. |
| 2015/0266290 A1 | 9/2015 | Dooley et al. |
| 2015/0352782 A1 | 12/2015 | Lisitsin et al. |
| 2016/0128909 A1 | 5/2016 | Fontein et al. |
| 2016/0198576 A1 | 7/2016 | Lewis et al. |
| 2016/0230005 A1 | 8/2016 | Mayumi et al. |
| 2016/0244625 A1 | 8/2016 | Clapp et al. |
| 2017/0039898 A1 | 2/2017 | Kim |
| 2017/0144368 A1 | 5/2017 | Bihari et al. |
| 2017/0225491 A1 | 8/2017 | Miller |
| 2018/0066115 A1* | 3/2018 | Achenbach .............. C08L 83/04 |
| 2018/0186076 A1 | 7/2018 | Backer et al. |
| 2018/0244854 A1 | 8/2018 | Drazba et al. |
| 2018/0281276 A1 | 10/2018 | Milroy et al. |
| 2018/0281294 A1 | 10/2018 | Gottschalk-Gaudig et al. |
| 2019/0100626 A1 | 4/2019 | Durban et al. |
| 2020/0108548 A1 | 4/2020 | Frances et al. |
| 2020/0315975 A1 | 10/2020 | Loeb et al. |

FOREIGN PATENT DOCUMENTS

| | | |
|---|---|---|
| WO | 2017081028 A1 | 5/2017 |
| WO | 2017144461 A1 | 8/2017 |

OTHER PUBLICATIONS

Sirrine, J., "Tailoring Siloxane Functionality for Lithography-based 3D Printing," Dissertation in Macromolecular Science and Engineering, Virginia Polytechnic Institute and State University, Jun. 19, 2018, 357 pages.
Wikipedia, "Microfluidics," Wikipedia, 2020, 22 pages, retrieved from https://en.wikipedia.org/wiki/Microfluidics.
Wikipedia, "Haze meter," Wikipedia, 2017, 1 page, retrieved from https://en.wikipedia.org/wiki/Haze_meter#:~:text=See%20through%20quality%20is%20measured,meter%20also%20measures%20total%20transmittance.
Slideshare, "Luminous transmittance & Haze, Clarity and Photo elasticity," Slideshare, Jun. 3, 2014, 18 pages, retrieved from https://www.slideshare.net/AttittudeBlogger/amal-ppt#:~:text=LUMINOUS%20TRANSMITTANCE%20%26%20HAZE%20%EF%81%B5%20Luminous,light%20passes%20through%20a%20sample.
Durban et al., U.S. Appl. No. 15/721,528, filed Sep. 29, 2017.
Non-Final Office Action from U.S. Appl. No. 15/721,528, dated Oct. 9, 2018.
Final Office Action from U.S. Appl. No. 15/721,528, dated Feb. 26, 2019.
Advisory Action from U.S. Appl. No. 15/721,528, dated May 3, 2019.
Non-Final Office Action from U.S. Appl. No. 15/721,528, dated Jul. 12, 2019.
Final Office Action from U.S. Appl. No. 15/721,528, dated Nov. 1, 2019.
Advisory Action from U.S. Appl. No. 15/721,528, dated Jan. 13, 2020.
Notice of Allowance from U.S. Appl. No. 15/721,528, dated Feb. 26, 2020.
Corrected Notice of Allowance from U.S. Appl. No. 15/721,528, dated Apr. 14, 2020.
Corrected Notice of Allowance from U.S. Appl. No. 15/721,528, dated Apr. 27, 2020.
Simtec, "Reinforcing Fillers in Liquid Silicone Rubber Compounds," Simtec Silicone Parts, Dec. 11, 2017, 11 pages, retrieved from https://www.simtec-silicone.com/reinforcing-fillers-liquid-silicone-rubber-compounds/.
International Search Report and Written Opinion from PCT Application No. PCT/US18/53452, dated Oct. 26, 2018.
Duoss et al., "Three-Dimensional Printing of Elastomeric, Cellular Architectures with Negative Stiffness," Advanced Functional Materials, vol. 24, 2014, pp. 4905-4913.
Aerosil, "Technical Data Sheet for Aerosil R 9200," Product information, Jan. 2018, 1 page.
Schmalzer et al., "Gamma radiation effects on siloxane-based additive manufacture structures," Radiation Physics and Chemistry, vol. 130, 2017, pp. 103-111.
Grassie et al., "The Thermal Degradation of Polysiloxanes—Part 4: Poly (Dimethyl/Diphenyl Siloxane)," Polymer Degradation and Stability, vol. 2, 1980, pp. 67-83.
Qu et al., "Effect of Diphenylsiloxane Unit Content on Relaxation Behavior of Poly (dimethylsiloxane-co-diphenylsilxane)," Journal of Polymer Science: Part B: Polymer Physics, vol. 46, 2008, pp. 1652-1659.
Dowcorning, Sylgard (R) 184 Silicone Elastomer Kit (Base information is below), Dow Corning Corporation, Material Safety Data Sheet, Version 2.0, Revised Mar. 29, 2007, 15 pages.
Dowcorning, Sylgard (R) 184 Silicone Elastomer Kit (Curing Agent information is below), Dow Corning Corporation, Material Safety Data Sheet, Version 2.5, Revised Jan. 16, 2014, pp. 1-8.
International Preliminary Examination Report from PCT Application No. PCT/US2018/053452, dated Apr. 9, 2020.
Kopylov et al., "Silica fillers for silicone rubber," International Polymer Science and Technology, No. 5, 2010, pp. 32-43.
Aerosil, "Hydrophilic fumed silica," Product Information Aerosil 380, May 2019, 2 pages.
Aerosil, "Hydrophobic fumed silica," Product Information Aerosil R 812S, Oct. 2019, 2 pages.
Avantor, "CAT-7717" Avantor Safety Data Sheet, Revision date May 27, 2019, 7 pages.
Nusil, "PLY-7716," NuSil Safety Data Sheet, Revision date Sep. 7, 2016, 6 pages.
Nusil, "PLY-7664," NuSil Safety Data Sheet, Revision date Sep. 19, 2016, 6 pages.

* cited by examiner

TRANSPARENT 3D PRINTED SILOXANE ELASTOMERS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing of siloxane materials, and more particularly, this invention relates to transparent siloxane-based inks and additive manufacturing processes using such inks.

BACKGROUND

Additive manufacturing technology is a promising new venture wherein there have been noted time savings for production, cost savings on materials and time and possible metamaterials applications. In particular, direct ink writing (DIW) is a micro-extrusion technique where a printable ink is deposited in a layer-by-layer fashion to build up an object.

Recent contemplated approaches have demonstrated the flowable nature of liquid siloxane materials may be used in a DIW process of additive manufacturing (AM) where the resulting formed three-dimensional (3D) structures retain their shape using methodology disclosed in U.S. patent application Ser. No. 15/721,528 which is herein incorporated by reference.

Moreover, it would be desirable to 3D print a transparent siloxane elastomer. Various applications would benefit from a tunable structure of transparent siloxane elastomer. For instance, a transparent siloxane elastomer structure may be printed to allow for inspection of materials through the structure.

However, contemplated approaches of siloxane-based inks for 3D printing have not generated transparent structures. The formed products had very high haze. Moreover, in large builds, it is difficult to denote locations of possible failed portions of a 3D printed structure. Additionally, a transparent system may facilitate alignment of in part location during assembly of the system. However, disadvantages to developing transparent siloxane elastomers include less than ideal mechanical properties of the cured matrix due to a high phenyl content or poor reinforcing properties due to the presence of MQ resins. Thus, fabricating self-supporting transparent 3D printed structures has been elusive.

SUMMARY

In one embodiment, an ink includes a siloxane polymer having at least 13 mol. % diphenylsiloxane content relative to the total mol. % of the siloxane polymer, and a filler having a refractive index about matching a refractive index of the siloxane polymer where the refractive indices are within about 5% of one another but are ideally as closely matched as possible.

In another embodiment, a product includes a transparent three-dimensional (3D) structure having physical characteristics of formation by additive manufacturing, where the structure includes a siloxane polymer having at least 13 mol. % diphenylsiloxane content relative to the total mol. % of the siloxane polymer, and a filler having a refractive index about matching a refractive index of the siloxane polymer.

In yet another embodiment, a method includes extruding an ink for forming a three-dimensional (3D) structure and curing the 3D structure for forming a transparent product. The ink includes a siloxane polymer having at least 13 mol. % diphenylsiloxane content relative to the total mol. % of the siloxane polymer and a filler having a refractive index about matching a refractive index of the siloxane polymer where the refraction indices are within about 5% of one another, but are ideally as closely matched as possible, the filler being present in the ink at about 5 wt. % to about 50 wt. %.

Other aspects and advantages of the present invention will become apparent from the following detailed description, which, when taken in conjunction with the drawings, illustrate by way of example the principles of the invention.

DETAILED DESCRIPTION

Figure 1:
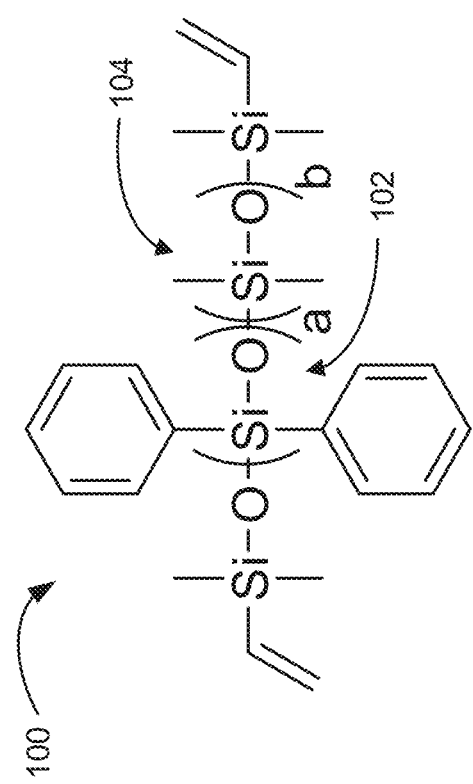
FIG. 1 is a schematic diagram of a siloxane polymer, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is noted that ambient room temperature may be defined as a temperature in a range of about 20° C. to about 25° C.

It is also noted that, as used in the specification and the appended claims, wt. % is defined as the percentage of weight of a particular component is to the total weight/mass of the mixture. Vol. % is defined as the percentage of volume of a particular compound to the total volume of the mixture or compound. Mol. % is defined as the percentage of moles of a particular component to the total moles of the mixture or compound. Atomic % (at. %) is defined as a percentage of one type of atom relative to the total number of atoms of a compound.

The following description defines a material being transparent as allowing light to pass through so that objects behind may be distinctly seen. Transparency of a material is generally defined as having a luminous transmittance value of at least 85% of light passing through the material, and a haze of less than 4% in a 2.5 mm thick sample. Haze is defined as the cloudy appearance of the specimen and may be caused by surface imperfections, density changes, etc. In some cases, a degree of transparency may also be defined as not opaque, optically clear, etc. These are by way of example only and are not meant to be limiting in any way.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques.

The following description discloses several preferred embodiments of transparent siloxane-based formulations for forming transparent elastomeric three-dimensional structures and/or related systems and methods.

In one general embodiment, an ink includes a siloxane polymer having at least 13 mol. % diphenylsiloxane content relative to the total mol. % of the siloxane polymer, and a filler having a refractive index about matching a refractive index of the siloxane polymer where the refractive indices are within about 5% of one another but are ideally as closely matched as possible.

In another general embodiment, a product includes a transparent three-dimensional (3D) structure having physical characteristics of formation by additive manufacturing, where the structure includes a siloxane polymer having at least 13 mol. % diphenylsiloxane content relative to the total mol. % of the siloxane polymer, and a filler having a refractive index about matching a refractive index of the siloxane polymer.

In yet another general embodiment, a method includes extruding an ink for forming a three-dimensional (3D) structure and curing the 3D structure for forming a transparent product. The ink includes a siloxane polymer having at least 13 mol. % diphenylsiloxane content relative to the total mol. % of the siloxane polymer and a filler having a refractive index about matching a refractive index of the siloxane polymer where the refraction indices are within about 5% of one another, but are ideally as closely matched as possible, the filler being present in the ink at about 5 wt. % to about 50 wt. %.

A list of acronyms used in the description is provided below.
3D Three-dimensional
AM Additive manufacturing
C Celsius
cSt centiStokes
DIW Direct Ink Writing
DPS diphenylsiloxane
g gram
mol. % mole percent
Pa Pascals
PDMS polydimethylsiloxane
PHMS poly(hydromethyl)siloxane
ppm parts per million
Pt Platinum
RI refractive index
s seconds
wt. % weight percent Inks with a specific rheology used in direct ink write 3D printing allow the resulting 3D printed structures to retain their shape for an extended period of time before curing. According to various embodiments, siloxane-based inks with appropriate rheological behavior for 3D printing result in printing 3D structures with controlled architectures. Various embodiments described herein demonstrate the capability to tune the stiffness of printable siloxane materials by controlling the chemistry, network formation, and crosslink density of siloxane-based ink formulations in order to overcome the challenging interplay between ink development, post-processing, material properties, and performance. Various embodiments described herein identify materials and methods by which to prepare custom-tailored 3D printable siloxane materials through DIW processes.

Siloxane elastomers have broad versatility within a variety of advanced material applications, such as soft robotics, biomedical devices, and metamaterials. In some instances, siloxane elastomer may be referred to as silicone rubbers. For this disclosure, siloxane elastomers include siloxane as defined as having an oxygen (O) bridge between silicon (Si) atoms, e.g., Si—O—Si—O. However, many siloxane materials are not naturally pseudoplastic or thixotropic in which a solid siloxane material becomes liquid with applied stress. It would be desirable to develop an ink using siloxane materials so that siloxane-based 3D structures may be formed.

In one embodiment, a combination of a phenylated siloxane and fumed silica filler is created where the refractive index (RI) of siloxane and filler are RI-matched to produce a transparent resin system. In one approach, addition of a thixotropic agent to the combined siloxane/fumed silica material produces a thixotropic resin having the correct rheology for extrusion-based 3D printing, e.g., direct ink write (DIW).

In one embodiment, a siloxane-based ink includes a siloxane polymer having at least 12 mol. % diphenylsiloxane content relative to the total mol. % of the siloxane polymer and a filler having a refractive index (RI) about matching a RI of the siloxane polymer where the RIs are within about 5% of one another, but are ideally as closely matched as possible. In some approaches, the siloxane polymer includes a vinyl-terminated siloxane macromer. In one approach, the ink may be tuned for transparency by increasing the diphenyl content to increase the refractive index of the diphenyl siloxane polymer to match the refractive index of the filler, e.g., the fumed silica.

As defined herein, transparency of the siloxane-based ink is defined by the extent of allowing light to pass through the ink so that objects behind may be distinctly seen. Furthermore, transparency of the ink is defined as the ink having a luminous transmittance value of at least 85% of light passing through the cured material with the haze (e.g., cloudy appearance) of the material being less than 4%.

In previous studies, siloxane-based inks comprised of monomers, macromers, etc. having a moderate to low amount of diphenyl siloxane backbone have haze above 4% inhibiting transparency of the material. Without wishing to be bound by any theory, it is believed that the macromers did not have a refractive index that could match the fumed silica filler. Thus, by including a siloxane polymer having a higher diphenyl content, the anchoring refractive index of the ink (e.g., feedstock) and the fumed silica filler may be matched thereby resulting in a transparent ink and a resulting transparent structure.

In one approach, the ink may include a siloxane polymer having a high diphenyl content, at least 12 mol. % diphenyl content. In various approaches, the diphenyl content of the siloxane polymer is defined as the mol. % of diphenyl moieties to the total mol. % of siloxane polymer. In one approach, the siloxane polymer is a copolymer having dimethylsiloxane content. For example, as illustrated in FIG. 1, the siloxane polymer may include a vinyl-terminated poly(diphenyl)-co-(dimethyl)siloxane copolymer 100 having a defined number a of diphenylsiloxane 102 units, and a defined number b of dimethylsiloxane 104 units.

In some approaches, the diphenyl content of the siloxane polymer may only be limited by a higher diphenyl content that results in changes of the mechanical properties of the material. For instance, a pure dimethyl siloxane elastomer retains an operating temperature in a range of −40° C. and up to 200° C. A feedstock having about 3 mol. % diphenyl siloxane effectively removes the crystallinity in these elastomers and has a useful operating temperature as low as −100° C. Sequentially increasing the diphenylsiloxane content in the copolymer leads to a coincident increase in the glass transition temperature (Tg) of the cured elastomer and the useful temperature increases above −100° C. Thus, increasing the diphenyl content allows adjustment of the refractive index for transparent materials, but increasing the diphenyl content above about 25 mol. % may result in the loss of some elastomer properties and lower temperatures.

In some approaches, a branched siloxane resin (e.g., a MT resin, MQ resin, etc.) may be included in the ink to tune the hardness of the resulting structure as long as the resin addition does not affect the transparency of the siloxane ink. For example, siloxane-based inks with a higher content of a vinyl containing, phenylated MT resin (e.g., NuSil PLY-7716) impart an increase in hardness while retaining the transparency. With increasing concentration of these resins (MT resin, MQ resin, etc.) the material of the printed 3D elastomeric structure has higher hardness and lower elongation. A transparent printed 3D structure formed from a transparent ink having a combination of mainly vinyl containing, phenylated MT resin (e.g., NuSil PLY-7716) may likely have a low hardness and high elongation.

In one approach of the ink, the filler includes a fumed silica. In various approaches the filler is present in the ink at about 5 wt. % to about 50 wt. % relative to the total weight of the ink, and preferably in a range of about 10 wt. % to about 30 wt. % of total weight of the ink. In some approaches, silica fillers with reduced surface area allow an increase degree of silica loading without over-saturating the liquid ink matrix, and thereby resulting in highly stiff printable siloxane materials.

In some approaches, the filler may include a hydrophobic (treated) fumed silica. In other approaches, the filler may include a hydrophilic (untreated) fumed silica. In one approach, the filler may include a combination of both hydrophobic and hydrophilic fumed silica. Without wishing to be bound by any theory, advantages of including both hydrophobic and hydrophilic fumed silica in a single ink composition include a) hydrophobic silica provides lower viscosity when compounded but not thixotropy, and b) the use of a hydrophilic silica may provide sufficient thixotropy without the addition of a thixotropic additive. In some approaches, an ink may include only a hydrophilic fumed silica that provides sufficient thixotropy with the diphenyl siloxane polymer such that the siloxane-based ink may not need a rheology modifying additive (e.g., a thixotropic additive). In other approaches, the filler may include resin reinforcing materials, e.g., MT resin, MQ resin, etc.

In some embodiments, the siloxane-based ink may include a crosslinking catalyst. In some approaches, the crosslinking catalyst may utilize hydrosilylation chemistry during the curing of the 3D structure, such as a platinum crosslinking catalyst (e.g., Karstedt Pt catalyst), ruthenium crosslinking catalyst, iridium crosslinking catalyst, and/or rhodium crosslinking catalyst. In some approaches, platinum-catalyzed hydrosilylation chemistry (e.g. platinum catalyzed addition of silanes to alkenes) may be used to cure the structured formed with siloxane-based inks. In other approaches, ruthenium-catalyzed hydrosilylation chemistry may be used to cure the structures formed with siloxane-based inks. In yet other approaches, iridium-catalyzed hydrosilylation chemistry may be used to cure the structures formed with siloxane-based inks. In yet other approaches, rhodium-catalyzed hydrosilylation chemistry may be used to cure the structures formed with siloxane-based inks.

In some approaches, it is advantageous to use platinum (Pt)-group metal-catalyzed hydrosilylation chemistry because the process does not generate volatile reaction products as compared to condensation cure reactions that produce byproducts such as acetic acid, ethanol, etc. Moreover, these byproducts could deleteriously contribute to some material shrinkage and deviation from the form of the printed 3D structure as deposited.

In some embodiments, the siloxane-based ink may include a Pt-group metal crosslinking catalyst involved in metal catalyzed hydrosilylation chemistry, at a concentration in the range of about 1 to about 1000 ppm, and preferably in a range of about 1 to about 100 ppm, and ideally, 1 to about 50 ppm. In some approaches, the siloxane-based ink may include an effective amount of Pt-group metal to initiate a metal-catalyzed hydrosilylation chemistry curing reaction at pre-defined curing conditions, e.g. a pre-defined elevated temperature.

In some embodiments, the siloxane-based ink may include an effective amount of an inhibitor for controlling a rate of curing by the crosslinking catalyst under ambient atmospheric conditions, e.g., for increasing pot life duration. In some approaches, the inhibitor may be selected based on the crosslinking catalyst. In some approaches, to maximize the printing time before cure (for example, delay the curing reaction as long as possible), an appropriate choice of a reaction inhibitor relative to the crosslinking catalyst may be added to inhibit platinum-catalyzed curing chemistry, thereby providing a prolonged pot life duration for extended 3D printing sessions.

In some approaches, in the absence of the reaction inhibitor, the curing mechanism involving the polymerization reaction may proceed rapidly thereby solidifying the printed part within minutes. Thus, a metal-catalyst crosslinking catalyst (for example Karstedt Pt catalyst), without reaction inhibitor may be undesirable for siloxane-based inks involved in the printing of large parts.

In some approaches, the crosslinking catalyst may induce curing in response to ultraviolet radiation. In other approaches, a crosslinking catalyst may induce curing in response to free radical chemistry. In yet other approaches, the crosslinking catalyst may induce curing in response to ionizing radiation. In other approaches, the crosslinking catalyst may induce curing via moisture curing. Known crosslinking catalysts may be used in such approaches.

In some embodiments, the siloxane-based ink may include a crosslinking agent to tune the hardness in the transparent elastomeric material. For example, one hydrosilylation cure of siloxanes involves a poly(methylhydrosiloxane)-containing additive in which the number of methylhydrosiloxane units along the polymeric or oligomeric chain may be greater than 3 per molecule. In various embodiments, through the implementation of dihydride chain extension chemistry, a siloxane-based ink may be formed with very low hardness and stiffness and increased elongation that may be applicable to soft robotics and flexible electronics. In some approaches, a cross linking agent may include hydride terminated chain extension additives, for example, a hydride terminated PDMS-poly(hydromethylsiloxane)(PHMS) copolymer. In other approaches, a short chain vinyl terminated PDMS additive may be included to impart greater hardness and less elongation to the cured material.

In various embodiments, siloxane-based inks may be prepared with a proper rheology for 3D printing in which structures with pre-defined dimensions are formed. In one approach, the ink includes a thixotropic additive.

In preferred approaches, a vinyl-terminated diphenyl siloxane polymer may have a viscosity in a range of about 100 cSt to about 50,000 cSt. In preferred approaches, the siloxane polymer has a viscosity in a range of about 100 centistokes (cSt) to about 50,000 cSt. In one approach, the viscosity of the siloxane polymer may be below 20,000 cSt.

In some embodiments, a rheology modifying additive may be added to impart pseudoplasticity in the siloxane ink. Rheology modifying additives impart thixotropy in siloxane materials. A rheology modifying additive may be a thixotropic additive that imparts pseudoplasticity in siloxane elastomers. In some approaches, the rheology modifying additive may be a siloxane polyether, silanol containing poly(dimethylsiloxane), a methylvinyl siloxane (or dimethyl siloxane)-dimethoxy (glycidoxypropyl)-terminated, glycerol, 2-propanol, hydrophilic fumed or precipitated silica, or combinations thereof. In some embodiments, the siloxane-based ink may include a rheology modifying additive in a range of about 0.01 wt. % to about 10.0 wt. % of total composition, and preferably about 0.1 wt. % to about 1.0 wt. % of total composition.

Without wishing to be bound by any theory, it is believed that the mechanism of pseudoplasticity of a siloxane-based ink, according to some embodiments, involves the formation of a stable 3D network between treated-silica filler particles and a rheological modifying additive via hydrogen bonding and potential van der Waals interactions.

In other approaches, a more hydrophilic reinforcing filler such as untreated fumed silica may be incorporated into the siloxane-based material to impart thixotropy of the siloxane material into solid-like network in the absence of applied stress. The mechanism of pseudoplasticity may be attributed to unreacted silanol groups on the silica surface, thereby allowing for particle associations through hydrogen bonding to form an anti-sagging network exhibiting shape retention behavior.

Embodiments described herein encompass a low-temperature stable siloxane-based material with the ideal rheology for 3D printing, which may be custom formulated to yield a wide range of physical properties applicable to a variety of fields and industries. For example, the reinforcing filler may be refractive index-matched to the siloxane component to impart a 3D siloxane structure with transparent optical-grade properties. According to various embodiments described herein, a wide-range of siloxane-based 3D structures of varying hardness and stiffness levels may be prepared from siloxane-based materials.

In some embodiments, siloxane-based inks may be pseudoplastic, non-Newtonian fluids, capable of being deposited in a layer-by-layer pattern during 3D printing.

In some embodiments, the siloxane-based inks described herein may be stable at low temperatures. Conventional PDMS-based materials exhibit relatively poor temperature stability beyond −45° C. due to PDMS crystallization. In some approaches, the replacement of PDMS with a random copolymer of PDMS and about 2-6 mole % diphenylsiloxane (DPS) may impart low temperature stability of siloxane-based ink. For example, incorporation of the diphenyl moieties of DPS may inhibit crystallization of the PDMS chains at reduced temperature. In other approaches, short chain vinyl-terminated PDMS may be used with additional silica filler to decrease the average molecular weight between crosslinking sites thereby resulting in high hardness and stiffness of the 3D printed structure from the siloxane-based ink.

In preferred embodiments, the ink may be characterized as being transparent after curing. The structure formed from the ink has a transparency by allowing light to pass through so that objects behind may be distinctly seen. Transparency of the ink after curing is defined as the cured ink having a luminous transmittance value of at least 85% of light passing through the cured material, e.g., as measured using a conventional transparency measuring technique. Moreover, the haze (e.g., cloudy appearance) of the material is less than 4%. A conventional haze meter may be used to characterize the haze of the cured ink.

In some embodiments, transparent siloxane-based inks may be formulated to yield two-part materials in predetermined ratios. In one approach, a siloxane-based transparent ink may include a rheology modifying additive. For example, as shown in Table 1, Part A may include vinyl-terminated poly(diphenyl)-co-(dimethyl)siloxane copolymer, a hydrophobic reinforcing filler (e.g., fumed silica), a rheology modifying additive, and a crosslinking catalyst; and Part B may include a crosslinking agent (PHMS), crosslinking catalyst inhibitor, and an additional vinyl-terminated poly(diphenyl)-co-(dimethyl)siloxane copolymer to create a 10:1 2-part A:B system. In some approaches, Part A may be assembled and then may be stored until use. Part B may

TABLE 1

Siloxane-based Ink having a Rheology Modifying Additive

| Component | Composition | Units |
|---|---|---|
| Part A [10 Parts] | | |
| Diphenyl siloxane polymer* | 83 | wt. % |
| Crosslinking catalyst (Pt) | 21.21 (~1.8%) | ppm |
| Hydrophobic Fumed Silica* | 15 | wt. % |
| Rheology Modifying Additive | 0.2 | wt. % |
| | 100 | |
| Part B [1 Parts] | | |
| PHMS Additive | 8.1 | wt. % |
| Inhibitor | 5000 (~0.5%) | ppm |
| Diphenyl siloxane polymer* | 91.4 | wt. % |
| | 100 | |

*Refractive Index matched be assembled and then stored until use. In other approaches, Part A and Part B may be assembled separately and used immediately.

For a transparent ink, the amount of diphenyl siloxane polymer may be adjusted so that the refractive index of the diphenyl siloxane polymer component of the ink matches the refractive index of the filler (e.g., hydrophobic fumed silica). In preferred approaches, the diphenyl siloxane content is approximately 15 mol. % to increase the refractive index to match the refractive index of the reinforcing filler (e.g., hydrophobic fumed silica). The crosslinking catalyst platinum (Pt) and the rheology modifying additive (e.g., thixotropic agent) provide resin thixotropy of the transparent ink. A polymerization inhibitor (e.g., 2-methyl-3-butyn-2-ol) may be included to moderate pot life of the ink.

In another approach, a transparent siloxane-based ink may not include a rheology modifying additive. As shown, for example, in Table 2, a diphenyl siloxane

TABLE 2

Siloxane-based Ink without a Rheology Modifying Additive

| Part A [10 Parts] | | |
|---|---|---|
| Component | Composition | Units |
| Diphenyl siloxane polymer* | 77 | wt. % |
| Branched siloxane polymer | 9 | wt. % |
| Crosslinking catalyst (Pt) | 23.59 (~1%) | ppm |
| Hydrophilic Fumed Silica* | 14 | wt. % |
| | 100 | |

| Part B [1 Parts] | | |
|---|---|---|
| Component | ETCH ppm | 50 g Part B |
| PHMS Additive | | 12.13 |
| Inhibitor | 5000 | 0.25 |
| Diphenyl siloxane polymer* | | 37.62 |
| | | 50.00 |

*Refractive Index matched polymer (e.g., vinyl terminated poly(diphenyl)-co-(dimethyl)siloxane copolymer) may be compounded with a reinforcing filler (e.g., hydrophilic fumed silica) which induces thixotropy without a rheology modifying additive (e.g., a thixotropic agent). The amount of diphenyl siloxane content may be about 15 mol. % to increase the refractive index of the diphenyl siloxane polymer to match the refractive index of the reinforcing filler (e.g., hydrophilic fumed silica). The crosslinking catalyst Pt and crosslinking agent PHMS are included for the crosslinking reaction during curing of the ink. A polymerization inhibitor (e.g., 2-methyl-3-butyn-2-ol) may be included to moderate pot life of the ink.

In some approaches, a siloxane polymer may be included to tune the stiffness of the resulting product formed from the ink. In some approaches, 3D printable siloxane-based materials may be prepared with hardness values as low as Shore 10A, indicating penetration by the indenter of the durometer. A Shore durometer may be used to provide a measure of hardness in polymer, elastomer, and rubber material in terms of the material's resistance to indentation. The inclusion of dihydride chain extenders may serve to increase the molecular weight of the siloxane-based polymer between crosslinking sites, yielding a material with reduced hardness and stiffness.

Figure 2:
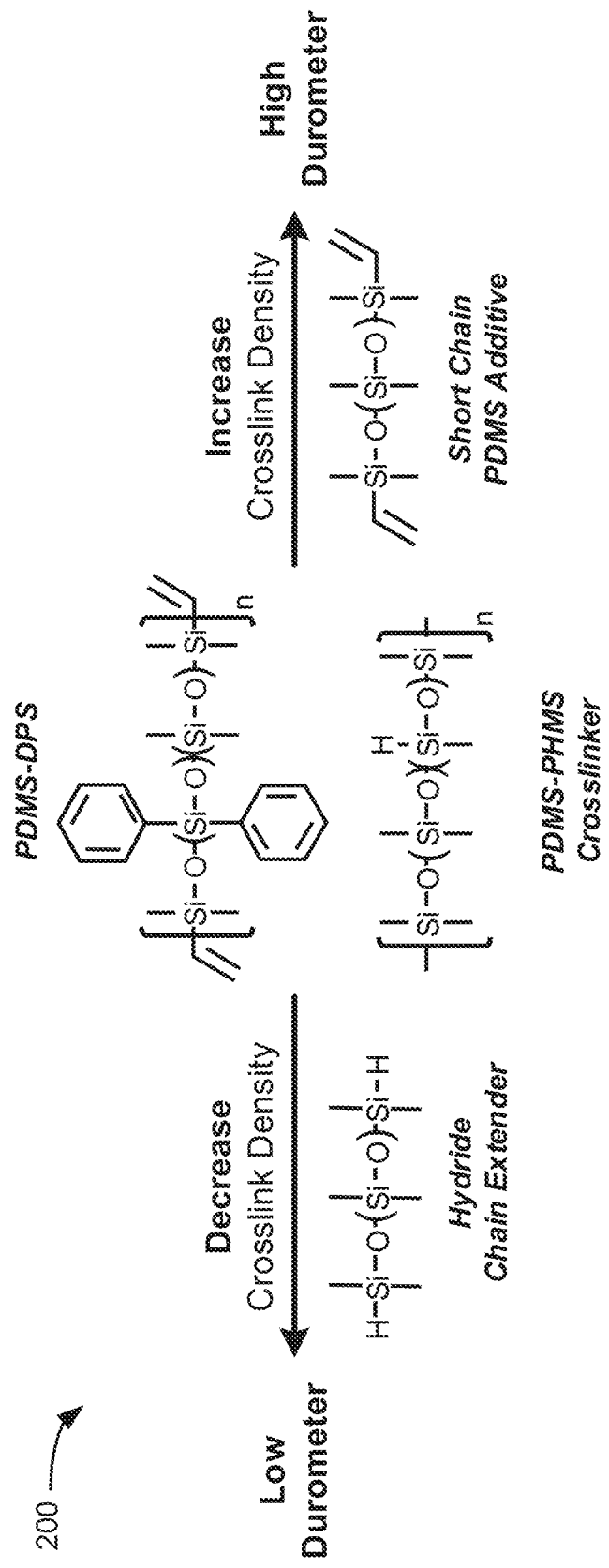
FIG. 2 is a schematic diagram of one approach to generate variable durometer siloxane elastomers, according to various embodiments.

As illustrated in FIG. 2, a simplified diagram 200 describes the formulation of variable durometer siloxane elastomers. The core formulation components involved in custom stiffness tuning include a vinyl terminated PDMS-DPS polymer in conjunction with a hydride terminated PDMS-PHMS copolymer crosslinker, other components may include silica fillers, rheological additives, inhibitors, and crosslinking catalyst (for example, Pt catalysts). In some approaches, a reduction in the effective crosslink density and less stiffness (shifting to the left, Low Durometer) may be achieved through the use of hydride terminated chain extension additives. In other approaches, an increase in the effective crosslink density and greater stiffness (shifting to the right, High Durometer) may be achieved through the use of low molecular weight or short chain vinyl terminated PDMS additives, or those additives such as vinyl containing siloxane resins, such as siloxane resins built from M and Q units (MQ resins), M and T units (MT resins), M and D and Q units (MDQ resins), other combinations therein, etc.

Looking to Table 2, Part A of the transparent siloxane based ink includes a branched siloxane additive (e.g., a MT resin, MQ resin, etc.) that may provide increased stiffness to the ink and to the resulting formed 3D structure. In an approach for a less stiff ink, the diphenyl content may only be included in the PDMS-DPS component (100%) of the ink without any additive to increase stiffness.

In some approaches, siloxane-based inks having high phenyl content, MQ (or siloxane resin), other reinforcement, etc. may have less than ideal mechanical properties of some siloxane elastomers described herein. Such materials may comprise a transparent siloxane ink may be 3D printable for forming transparent structure, monoliths, films, etc.

Figure 3A:
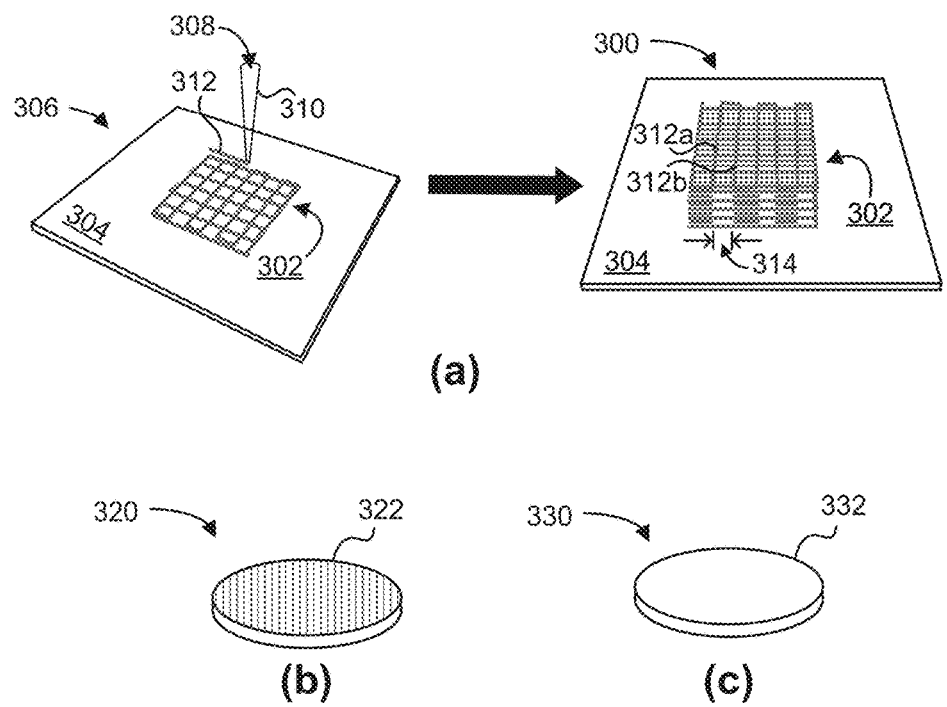
FIG. 3A are schematic diagrams of three-dimensional structures formed from transparent siloxane-based ink, according to various embodiments. Part (a) is an extruded three-dimensional structure having moderate porosity. Part (b) is an extruded three-dimensional structure having low porosity. Part (c) is a three-dimensional bulk structure.
Figure 3B:
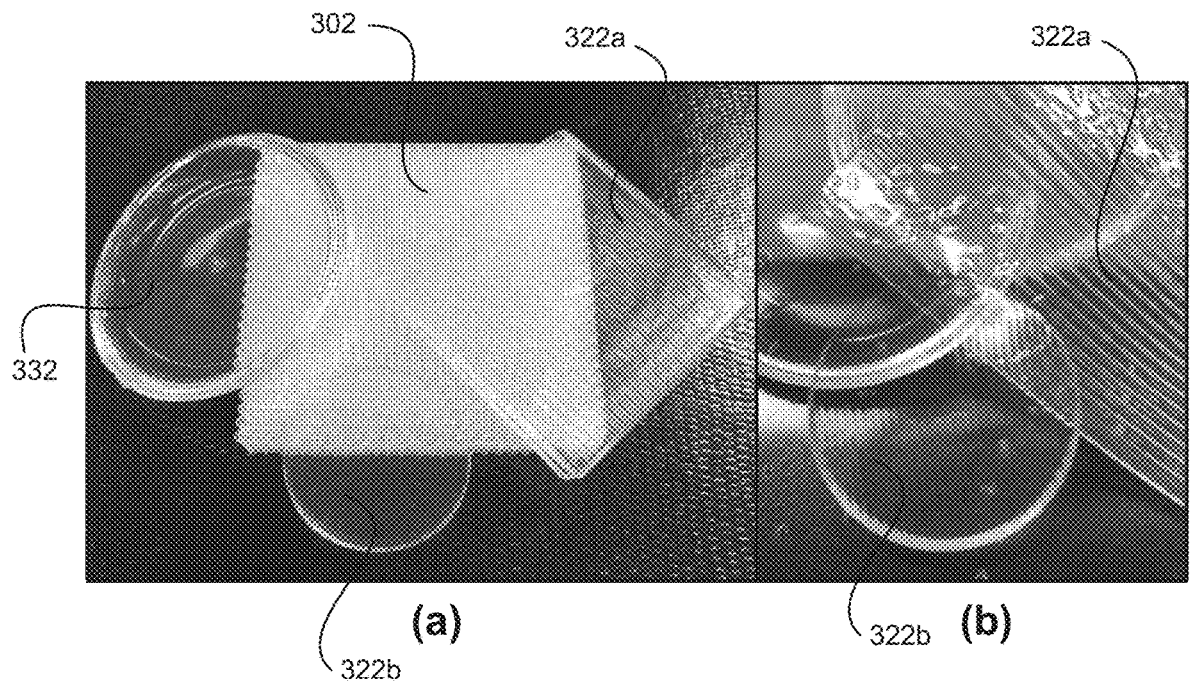
FIG. 3B are images of three-dimensional structures formed from transparent siloxane-based ink, according to various embodiments. Part (a) is an image that includes three dimensional structures having moderate porosity, low porosity, substantially no porosity, and a bulk structure. Part (b) is an image of a magnified view of the three-dimensional structures having low porosity and substantially no porosity.
Figure 3D:
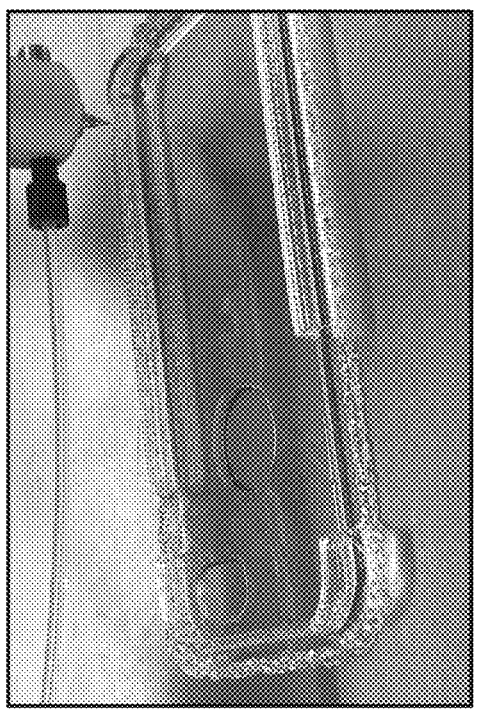
FIG. 3D are images of an extruded three-dimensional structure formed with transparent siloxane-based ink, according to one embodiment. Part (a) is an image of the three-dimensional structure during extrusion of the transparent siloxane-based ink. Part (b) is an image of the formed and cured three-dimensional structure.
Figure 3D:
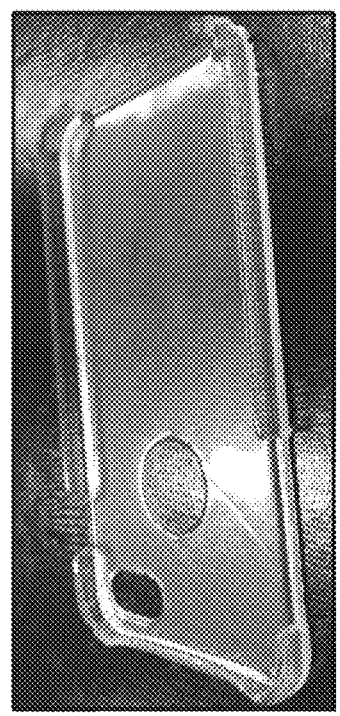
Figure 3C:
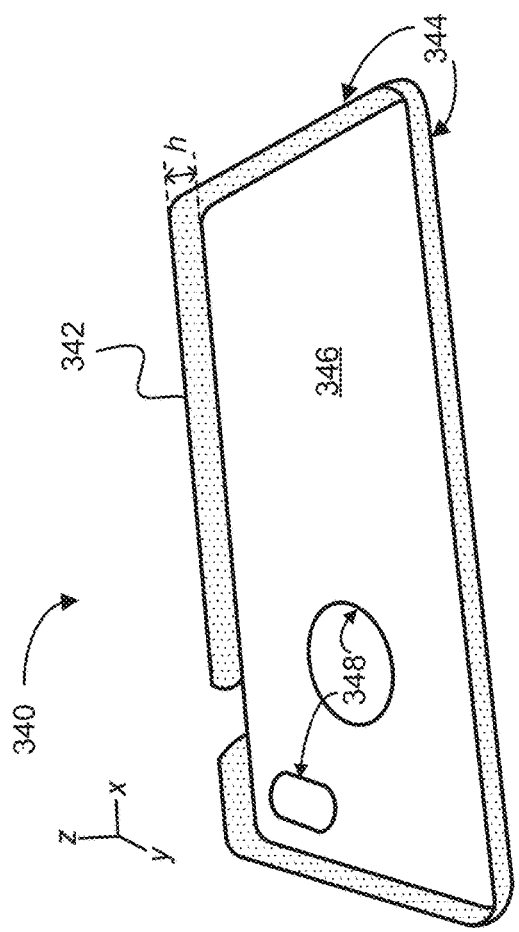
FIG. 3C is a schematic diagram of an extruded three-dimensional structure formed with transparent siloxane-based ink having a transparent portion and a layered geometric portion, according to one embodiment.

FIGS. 3A and 3C depict structures 300, 320, 330, and 340 of transparent siloxane-based elastomers, in accordance with one embodiment. As an option, the present structures 300, 320, 330, and 340 may be implemented in conjunction with features from any other embodiment listed herein, such as those described with reference to the other FIGS. Of course, however, each structure 300, 320, 330, and 340 and others presented herein may be used in various applications and/or in permutations which may or may not be specifically described in the illustrative embodiments listed herein. Further, each structure 300, 320, 330, and 340 presented herein may be used in any desired environment.

In one embodiment, a product includes a transparent three-dimensional (3D) structure having physical characteristics of formation by additive manufacturing where the structure includes a siloxane polymer and a filler having a refractive index about matching a refractive index of the siloxane polymer. Further, the siloxane polymer has at least 12 mol. % diphenylsiloxane content relative to the total mol. % of the siloxane polymer of the ink. In some approaches, the siloxane polymer may have at least 14 mol. % diphenyl content. In one approach, the siloxane polymer is a copolymer having dimethylsiloxane content. In one approach, the diphenyl content may be increased to increase the refractive index of the diphenyl siloxane polymer to match the refractive index of the filler, e.g., fumed silica.

The transparency of the 3D structure is defined as the 3D structure having a luminous transmittance value of at least 85% of light passing through the material of the 3D structure. Moreover, the haze (e.g., cloudy appearance) of the material of the 3D structure is no more than 4%.

Part (a) of FIG. 3A illustrates a schematic diagram of a 3D structure 300 having moderate porosity 302 formed by extrusion-based DIW printing 306. A transparent siloxane-based ink 308 may be extruded through a nozzle 310 onto a substrate 304 in one continuous extruded filament 312 to form a 3D geometric structure 300 (e.g., log pile, computer-aided design (CAD), etc.) having moderate porosity 302. In an approach using a transparent ink having tuned rheology to lessen the infill between the strands extruded from the nozzle, where the infill represents a space 314 that may be preserved between the strands 312a, 312b thereby resulting in a moderate porosity of the resulting 3D structure. However, in approaches in which a fully transparent structure is desired, increased infill between the extruded strands is preferred.

Part (b) of FIG. 3A illustrates a schematic diagram of a 3D structure 320 having a low porosity 322 where there is substantial infill (e.g., minimizing the space 314 of ink between the extruded strands 312a, 313b as shown in part (a)). In some approaches, the infill may be sufficient to result in a 3D structure having substantially transparent material throughout the structure.

Part (c) of FIG. 3A illustrates a bulk structure 330 of a transparent siloxane-based material having substantially no porosity 332. A bulk structure 330 may be formed by casting the transparent siloxane-based ink in a mold prior to curing.

FIG. 3B depicts images of examples of 3D structures formed with transparent siloxane-based ink, according to various approaches. Part (a) shows an image of four structures formed with transparent siloxane-based ink. A log-pile structure formed by extrusion-based DIW having moderate porosity similar to the structure as illustrated in the schematic diagram of a 3D structure having moderate porosity 302 of part (a) of FIG. 3A.

The image of part (a) of FIG. 3B also depicts two versions of a structure 322a, 322b formed by extrusion-based DIW having low porosity similar to the structure as illustrated in the schematic diagram of a 3D structure having low porosity 322 of part (b) of FIG. 3A. The structures 322a, 322b are close-packed structures where basically all the strands are running in the same direction, so they pack closely with each other. Structure 322b exhibits some space between the strands where the strands do not completely infill. The resin is transparent, however, the porosity in the material from insufficient infill may affect the transparency of the material.

The image of part (a) of FIG. 3B includes a bulk structure having substantially no porosity 332 formed from casting a mold having substantially no porosity that may be similar to the structure as illustrated in the schematic diagram of a 3D structure having substantially no porosity 332 of part (c) of FIG. 3A. The transparent siloxane-based ink may be printed to substantially full density. With minimal to low presence of air in the material, the bulk structure is transparent. These structures are presented for example only and are not meant to be limiting in any way.

Part (b) of FIG. 3B is an image of a magnified view of low porosity 3D structures 322a, 322b. The structure 322a shows a higher infill between the strands compared to the structure 322b thereby demonstrating greater transparency.

FIG. 3C is a schematic diagram 340 of engineered DIW extrusion printing of a printed 3D structure 342 having engineered regions of layered structure 344 and transparency 346 from a single continuous extruded filament. Moreover, the printed 3D structure may include engineered windows 348 that do not have ink present. In other words, the structure is formed with a continuous filament that forms a pattern in which some regions have ink and other regions do not having any ink thereby forming a window 348 in the structure 342. The region of layered structure 344 of the printed 3D structure 342 has a vertical height, in the z-direction from regions of transparency 346 in an x-y plane, that is a self-supporting structure until curing.

FIG. 3D, parts (a) and (b), depicts images of an example of an extruded 3D structure similar to the structure illustrated in FIG. 3C. Part (a) is an image showing the extrusion of transparent siloxane-based ink forming the layered structures of printed 3D structure after forming a region of transparency with windows (e.g., regions without ink present). Part (b) is an image of the printed 3D structure with transparent siloxane-based ink after curing.

The efficacy of the transparent siloxane-based ink to substantially infill the 3D printed cell phone case, as shown in the images of parts (a) and (b) of FIG. 3D was surprising. In contemplated approaches, it has been difficult to 3D print elastomeric material and achieve substantial infill between the extruded strands. Any residual space between the strands tends to lead to scattering of light at the light traverses through the material. As shown in part (b), the extruded filament of the transparent siloxane-based ink generated substantial shape retention around the sides in building the structure, and in the middle base region, there is substantial transparency indicative of efficient infill between the strands of extruded filament.

Figure 6A:
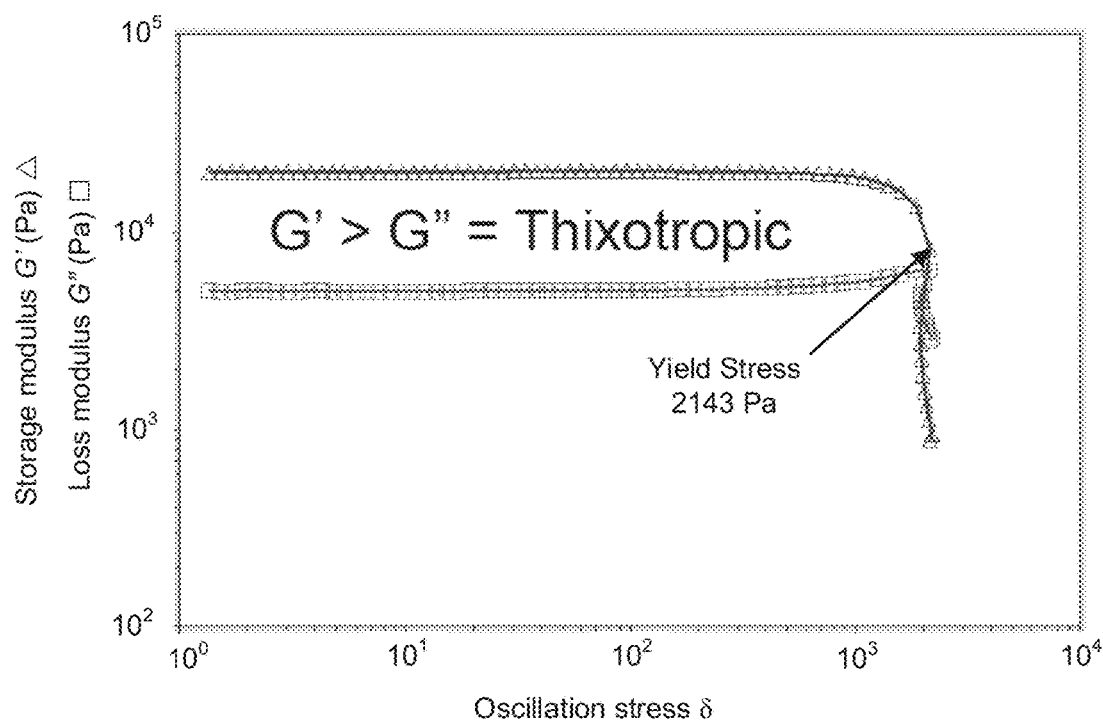
FIG. 6A is a yield stress profile of a transparent siloxane-based ink, according to one embodiment.
Figure 6B:
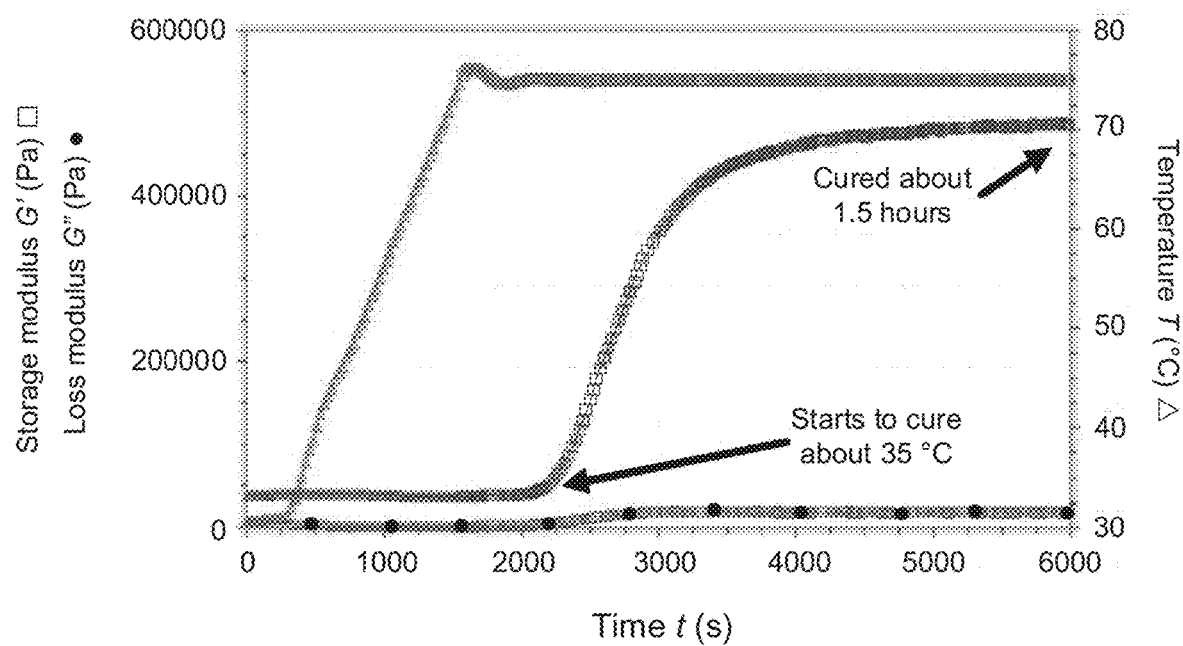
FIG. 6B is a cure profile of a transparent siloxane-based ink, according to one embodiment.

Using oscillatory rheology measurements, the crossover point of where G'=G" determines the yield stress of the material. Without wishing to be bound by any theory, it is believed the storage, e.g., elastic, modulus (G') must be greater than the loss, e.g., viscous, modulus (G") at low stress so that the material acts like a solid at low stress, and then with sufficient stress (an applied stress greater than the yield stress) the material starts to flow. Characteristics of the transparent siloxane-based ink, Example 2 (Table 4, see Experiments section), that formed the transparent structure depicted in parts (a) and (b) of FIG. 3D are shown in FIGS. 6A and 6B (see Experiments section).

According to one embodiment, the transparent 3D structure has physical characteristics of formation by additive manufacturing. In one approach, direct-ink-writing (DIW) affords the possibility of creating fine physical features (<1 mm) with single and multicomponent features not attainable by standard polymer casting methods. In one approach, a transparent 3D structure may have a physical property of being rigid and the cured extruded continuous filament forms a unique-shaped structure. A unique-shaped structure may be any structure that does not have a conventional shape (e.g., cube, cylinder, molded shape, etc.). In some approaches, a shape of a unique-shaped structure may be defined by a user, a computer program, etc.

In some approaches, the architectural features of the formed transparent 3D parts may have length scales defined by specific AM techniques. For example, features may have length scales in a range between 0.1 micron (μm) to greater than 100 μm, depending on the limitations of the AM techniques. In various approaches, AM techniques provide control of printing features, ligaments, etc. of 3D structures having length scales in a range between 0.1 μm to greater than 100 μm, and more likely greater than 10 μm. Further, a UV-curable functionality lends itself to light-driven AM techniques, including projection micro-stereolithography (PμSL) and direct laser writing via two photon polymerization (DLW-TPP). Stereolithography-based AM techniques are notable for high throughput, fine features, and detailed prototyping. Even higher resolution can be achieved with DLW-TPP, which can produce ligaments on the order of 100 nm.

Various embodiments described herein fabricate 3D print transparent elastomeric geometrically constrained structures for precise control and manipulation of fluids. In another approach, the printed transparent siloxane-based 3D structure may include an elastomeric lens. In one approach, the printed transparent 3D structure may be part of a microfluidic system for analysis of microfluid transport, mixing, reactions, separation, etc. phenomenon. For example, the printed transparent 3D structure may have microchannels formed therein for such things as drug delivery, sample extraction, etc.

Figure 4:
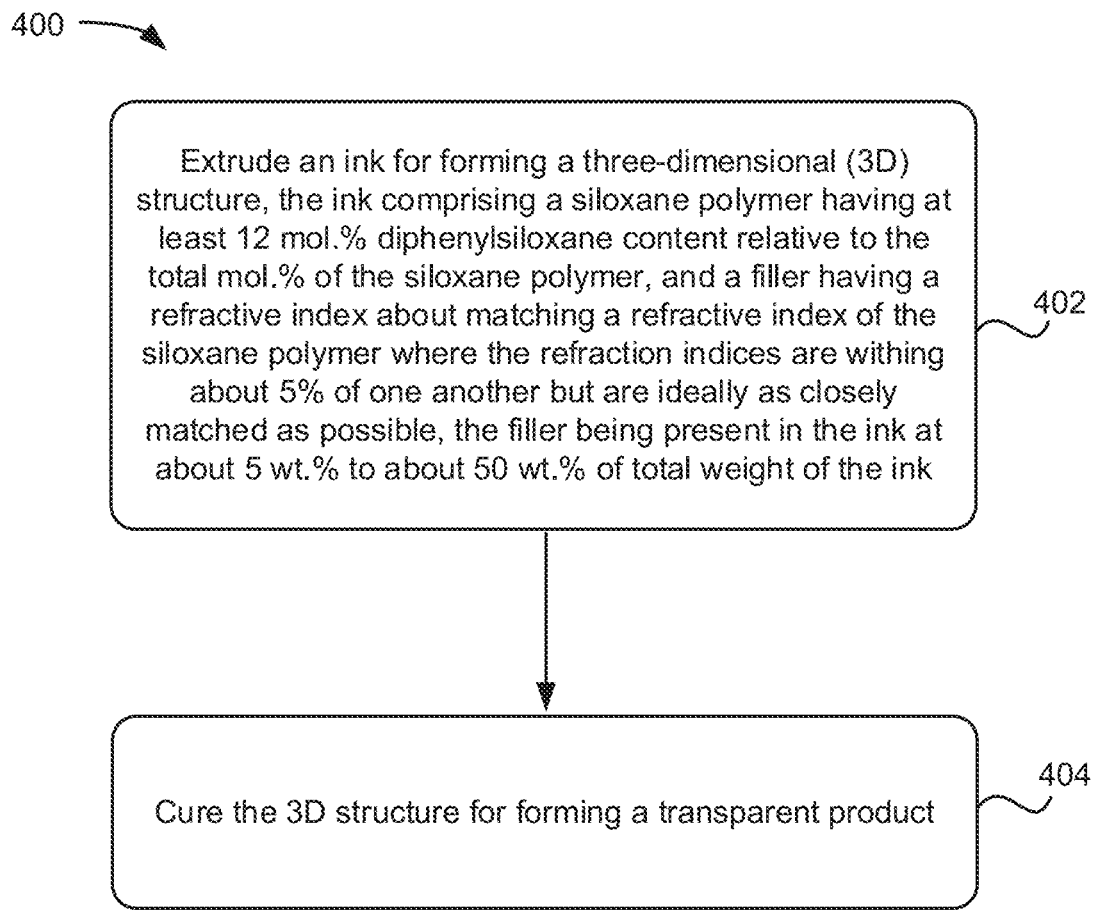
FIG. 4 is a flowchart of a method, according to one embodiment.

FIG. 4 shows a method 400 for additive manufacturing with transparent siloxane-based ink, in accordance with one embodiment. As an option, the present method 400 may be implemented to construct structures such as those shown in the other FIGS. described herein. Of course, however, this method 400 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 4 may be included in method 400, according to various embodiments. It should also be noted that any of the aforementioned features may be used in any of the embodiments described in accordance with the various methods.

According to one embodiment, the method 400 begins with step 402 involving extruding an ink for forming a three-dimensional (3D) structure. The ink includes a siloxane polymer and a filler having a refractive index about matching a refractive index of the siloxane polymer where the refraction indices are within about 5% of one another but are ideally as closely matched as possible. The siloxane polymer has at least 13 mol. % diphenylsiloxane content relative to the total mol. % of the siloxane polymer. Further, the filler is present in the ink at about 5 wt. % to about 50 wt. % of the total weight of the ink.

In one approach, the siloxane polymer may have at least 14 mol. % diphenyl content relative to the total mol. % of the siloxane polymer. In one approach, the siloxane polymer may be a copolymer having dimethylsiloxane content.

In a preferred approach the siloxane-based ink includes an additive as a filler. In one approach, the siloxane-based ink includes fumed silica as a reinforcing filler. For example, in one approach, the siloxane-based ink includes treated silica, e.g., hydrophobic silica, as a thickener of the ink composition. In some approaches, a concentration of the treated silica (e.g., fumed silica) in the siloxane-based ink may be in a range of about 5 wt. % to about 50 wt. % of total composition of the ink. In preferred approaches, the concentration of untreated silica may be in a range of 10 wt. % to about 30 wt. %. In some approaches, the ink may include untreated silica (e.g., hydrophilic fumed silica). An effective amount of untreated silica (e.g., fumed silica) for thickening the ink may be determined from the surface area of the untreated silica using known techniques.

In some approaches, step 402 may include adding to the ink a crosslinking catalyst and/or a crosslinking agent. In one approach, the crosslinking catalyst and/or crosslinking agent may be added to the ink in the cartridge of the extrusion device. Alternatively, the crosslinking catalyst and/or crosslinking agent may be part of a premade mixture that is fed through the cartridge.

In yet other approaches, step 402 may include adding to the ink an effective amount of an inhibitor for controlling a rate of curing by the crosslinking catalyst. In one approach, the inhibitor may be added to the ink in the cartridge of the extrusion device. Alternatively, the inhibitor may be part of a premade mixture that is fed through the cartridge.

In one approach, a transparent siloxane-based ink includes a rheology modifying additive, as described herein. In some approaches, an effective amount of rheology modifying additive may be added to impart siloxane pseudoplasticity in the extruded ink. In some approaches, a thixotropic agent may be included in the composition of the ink for 3D printing a self-supporting structure.

In some approaches, step 402 includes extruding the ink through the cartridge to form a structure. In various approaches, the presence of a rheology modifying additive imparts pseudoplasticity to the siloxane-based ink such that the compression stress of the ink in the cartridge allows the ink to be extruded from the cartridge during 3D printing.

In this and other embodiments, the ink may be extruded by a direct ink writing (DIW) device. In one approach, the ink may be extruded from a nozzle. In one approach, the ink may be added to a cartridge and the cartridge may include a nozzle. The ink may initially be in two parts (e.g., Part A and Part B) and may be combined (e.g., mixed) in the nozzle, where one or more of the components is added to the nozzle separately from the other components. A mixer may provide mixing within the nozzle. In another approach, the ink may be premade and fed to the nozzle.

For approaches involving extrusion-based additive manufacturing processes (e.g., DIW), the siloxane resin, mixture, etc. preferably is extrudable from nozzle sizes ranging from about 100 µm to about 1 mm but could be smaller or larger.

In one approach, the forming of the 3D structure may include extruding a continuous filament of the siloxane mixture through a nozzle to form a printed 3D structure having a plurality of continuous filaments arranged in a predefined pattern. In one approach, the predefined pattern may be a geometric pattern, e.g., a log-pile, a mesh, patterned architectures, etc.

In one embodiment, the product is a 3D printed structure having continuous filaments arranged in a predefined pattern. The predefined pattern may be formed from extrusion-based AM methods wherein continuous filaments are extruded with the transparent siloxane-based ink to form a predefined pattern.

In various approaches, for 3D printing of the ink composition using extrusion-based methodology, the ink composition preferably has shear-thinning behavior. Moreover, the ink composition exhibits a transition from a gel to a liquid at high shear rates. For example, in preferred approaches, the ink composition exhibits an oscillation stress of greater than about 100 pascals (Pa). In addition, in one approach, the gelled state of the extruded ink composition retains its shape to support its own weight during printing, i.e., the extruded structure is self-supporting.

In some approaches, the forming of a 3D structure includes forming a structure selected from one of the following: a mold, a cast, a template, etc. The ink may be extruded into a mold, cast, template, etc.

Step 404 of method 400 involves curing the 3D structure for forming a transparent product. In various approaches, the 3D printed structure of siloxane-based ink may be cured according to the crosslinking catalyst present in the siloxane-based ink. In some approaches, the temperature may be raised in order to initiate curing. In other approaches, UV curing may be used including UV irradiation to initiate curing of the printed structure. In yet other approaches, free radical chemistry (e.g., peroxide curing) may be used to initiate curing of the printed structure. In one approach, moisture curing may be used (e.g., a hydroxyl terminated PDMS material with a tin catalyst, ethoxy- or methoxy-terminated functional crosslinkers, etc.) to cure the printed structure with relative humidity (e.g., in a range of 5% to 95% relative humidity). In various other approaches, curing may be initiated by methods known by one skilled in the art.

In one approach, the transparent 3D structure may be cured to at least a predefined extent to form a siloxane matrix. In some approaches, the crosslinking catalyst may utilize hydrosilylation chemistry during the curing of the 3D structure. In one approach, the curing may occur at an elevated temperature. In one approach, a temperature of the curing may be in a range of about 30° C. to about 150° C. The conditions for curing as described herein are generally understood by one skilled in the art.

In some embodiments, the direct application of additive manufacturing using transparent siloxane-based inks with tunable stiffness may allow engineering of components and parts with specific properties including both low and high potential stiffness. In some approaches, siloxane-based materials with differential stiffness may be 3D printed in tandem or simultaneously to generate unique objects with novel properties that are applicable to a wide-range of fields such as soft robotics and stretchable electronics.

EXPERIMENTS

Material and Methods

Vinyl terminated poly(diphenyl)-co-(dimethyl)siloxane polymer PLY-7664, obtained from NuSil Technology (Bakersfield, CA). A branched siloxane resin polymer PLY-7716, obtained from NuSil Technology.

Platinum catalyst CAT-7716 obtained from NuSil Technology.

HMS-993, obtained Gelest, Inc (Morrisville, PA), 1-ethynyl-1-cyclohexanol (ETCH) was supplied by Sigma-Aldrich (St. Louis, MO). Bluesil™ Thixo Add 33646 was supplied by Elkem Siloxanes (Oslo, Norway). Aerosil® R813S and Aerosil® 380 were supplied by Evonik Industries (Essen, Germany), 3-methyl-3-butyn-3-ol (M3B) obtained from Sigma-Aldrich (St. Louis, MO).

All materials were used without further purification. Formulations were prepared using a Flacktek DAC 400 VAC (Landrum, SC) for compounding. Yield stress, viscosity, pot life measurements, and cure profiles were obtained with a TA Instruments AR3000EX rheometer equipped with a cross-hatched 35 mm Peltier parallel plate under a 1 mm sample gap spacing.

Once formulated, all siloxane-based inks were filtered (pressurized air, 90 psi) through a Swagelok 140 µm mesh filter (Solon, OH) into 30 mL syringe barrels (Nordson EFD Optimum, East Providence, RI) and centrifuged (Nordson EFD ProcessMate 5000) to eliminate entrapped air. A flat-ended piston was inserted to seal the rear of the syringe; whereas the syringe tip was equipped with a smooth-flow tapered nozzle (350 µm inner diameter) via luer-lock. The syringe was attached to a positive-displacement dispenser (Ultra 3800, Nordson EFD), which supplied the appropriate displacement to extrude ink through the nozzle. The syringe system was subsequently affixed to the z-axis of a custom Aerotech air-bearing gantry xy open frame movement stage, which was controlled via an A3300 controller through an Aerotech A3300 CNC operator interface (v5.05.000) (Aerotech Consumer Aerospace, Pittsburgh, PA0. The printed lattices were cured in a Yamato ADP300C vacuum drying oven (Yamato Scientific America, Inc, Santa Clara, CA).

Examples of Preparation of Transparent Siloxane-Based Ink

Table 3 lists the components of Example 1, a transparent siloxane-based ink having a rheology modifying additive, according to one embodiment. The refraction index of siloxane polymer (NuSil PLY-7664) was matched with the refraction index of Aerosil® R813S fumed silica. The ink includes the thixotropic agent Bluesil™ Thixo Additive. Part A was formed by charging a Flacktek 400 cup with NuSil PLY-7664, NuSil CAT-7716 and mixed for 1 minute at 3300 rpm. Next, Aerosil R813S was added and the combination mixed for 3 minutes at 3300 rpm. This was manually mixed with a

TABLE 3

Example 1 of Siloxane-based Ink having a Rheology Modifying Additive

| Component | Amount (g) | Composition | Units |
|---|---|---|---|
| Part A [10 Parts] | | | |
| NuSil PLY-7664* | 200 | 84.85 | wt. % |
| NuSil CAT-7716 | 0.2 | 21.21 | ppm |

TABLE 3-continued

Example 1 of Siloxane-based Ink having a Rheology Modifying Additive

| Component | Amount (g) | Composition | Units |
|---|---|---|---|
| Aerosil R812S* | 35 | 14.85 | wt. % |
| Bluesil Thixo Additive | 0.5 | 0.21 | wt. % |
| | 235.7 | | |
| Part B [1 Parts] | | | |
| Gelest HMS-992 | 0.081 | 8.13 | wt. % |
| M3B | 0.005 | 5000 | ppm |
| NuSil PLY-7664* | 0.914 | 91.37 | wt. % |
| | 1.000 | | |

*Refractive Index matched spatula to incorporate the fumed silica and was again mixed for 3 minutes at 3300 rpm with vacuum (50 Torr). Lastly a thixotropic additive was added and mixed an additional 3 minutes with vacuum (50 Torr) at 3300 rpm. Part A was allowed to cool to room temperature prior to use.

Part B was prepared by combining all constituents in a Flacktek cup and mixing at 3300 rpm for 1 minute. Part B was allowed to cool to room temperature prior to use.

Table 4 lists components of Example 2, a transparent siloxane-based ink without a rheology modifying additive, according to one embodiment. The refraction index of siloxane polymer (NuSil PLY-7664) was matched with the refraction index of Aerosil® 380 fumed silica. A branched siloxane resin polymer (NuSil PLY 7716) was included to increase stiffness of the ink. Methodology for preparing the ink was similar to the methodology of Example 1.

TABLE 4

Example 2 of a Siloxane-based Ink

Part A [10 Parts]

| Component | Amount (g) | Composition | Units |
|---|---|---|---|
| NuSil PLY-7664* | 268 | 76.63 | wt. % |
| NuSil PLY-7716 | 29.6 | 8.46 | wt. % |
| NuSil CAT-7716 | 0.33 | 23.59 | ppm |
| Aerosil 380* | 51.8 | 14.81 | wt. % |
| | 349.73 | | |

Part B [1 Parts]

| Component | Amount (g) | ETCH ppm | 50 g Part B |
|---|---|---|---|
| Gelest HMS-992 | 0.243 | | 12.13 |
| M3B | 0.005 | 5000 | 0.25 |
| NuSil PLY-7664* | 0.752 | | 37.62 |
| | 1.000 | | 50.00 |

*Refractive Index matched

Pt-Catalyzed Hydrosilylation Chemistry

A Pt catalyst in methylvinylcyclic siloxane was selected as the platinum catalyst and 3-methyl-3-butyn-3-ol (M3B) was selected as the reaction inhibitor. To obtain inks with a long printable time windows, 400-500 ppm M3B was added for about 30 ppm Pt catalyst to sufficiently inhibit siloxane curing while still providing rapid curing at elevated temperatures (about 75° C.).

For Examples 1 and 2, curing occurred during a thermal heating of the sample. The temperature ramp started at room temperature (about 35° C.) and the temperature was increased at rate of about 3° C./minute to a maximum temperature of 75° C.

Evidence of Pseudoplasticity

Analysis of shape retention behavior may be used to evaluate the relationship between properties of siloxane-based ink materials. In brief, using a model of Hershel-Bulkley material moving through a cylindrical nozzle, an extruded core material having properties characteristic of an unyielded siloxane-based ink based may be subjected to beam deflection analysis. Equation 1 shows the relationship of the elastic behavior of an ink to a desired beam deflection, in which γ represents the specific weight of an ink and s represents the beam length (L) to strand diameter (D) ratio, L/D.

$$G' \geq 1.4\gamma s^4 D \qquad \text{Equation 1}$$

According to Equation 1, the 3D printable siloxane-based inks may possess G' values several orders of magnitude higher than that recommended for a strand deflection of ≤0.05 D. Thus, in some approaches, the deposition speed may be tuned to print lower G' inks for 3D printed architectures.

Yield Stress Profile and Cure Profile of Example 1

Figure 5A:
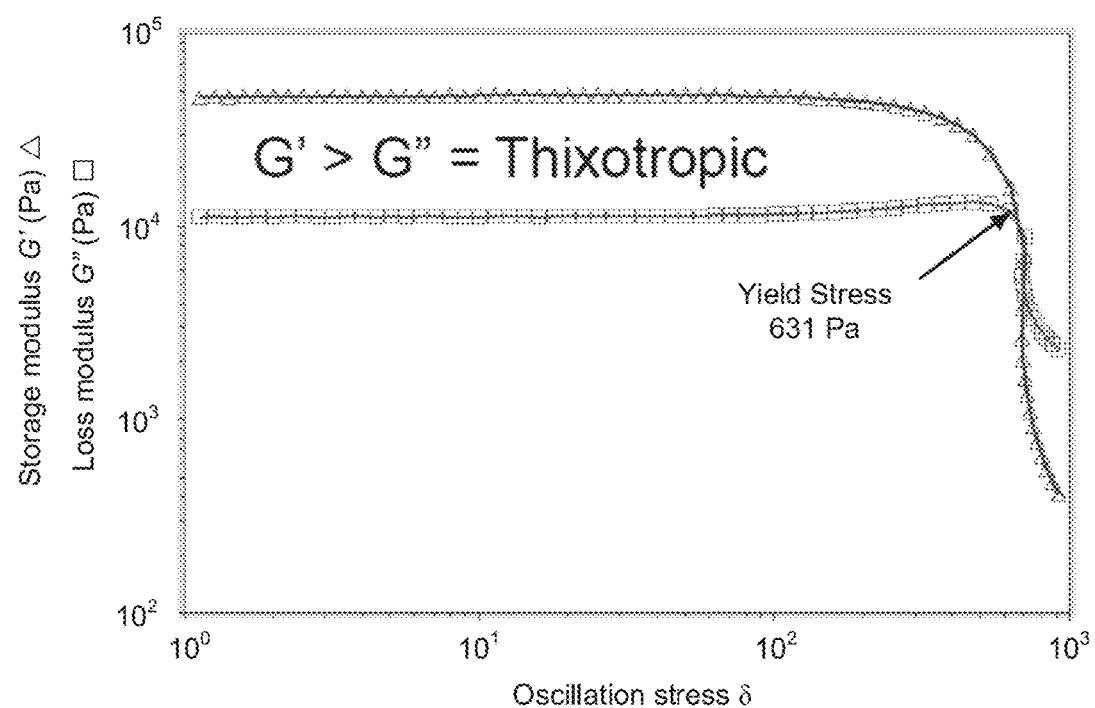
FIG. 5A is a yield stress profile of a transparent siloxane-based ink having a thixotropic additive, according to one embodiment.

The transparent siloxane-based ink of Example 1 was used to form the transparent 3D structures depicted in FIG. 3B, parts (a) and (b). FIG. 5A shows the yield stress of the transparent ink of Example 1 (including a thixotropic additive) by plotting oscillation stress (δ, Pa, x-axis) of the Storage Modulus (G', y-axis Δ) and the Loss Modulus (G", y-axis □) values. Yield stress was defined as the oscillatory stress (631 Pa) corresponding to a similar value of the measured storage modulus (G') and the loss modulus (G"). At zero stress, the material had sufficient storage modulus not to slump after extrusion.

Figure 5B:
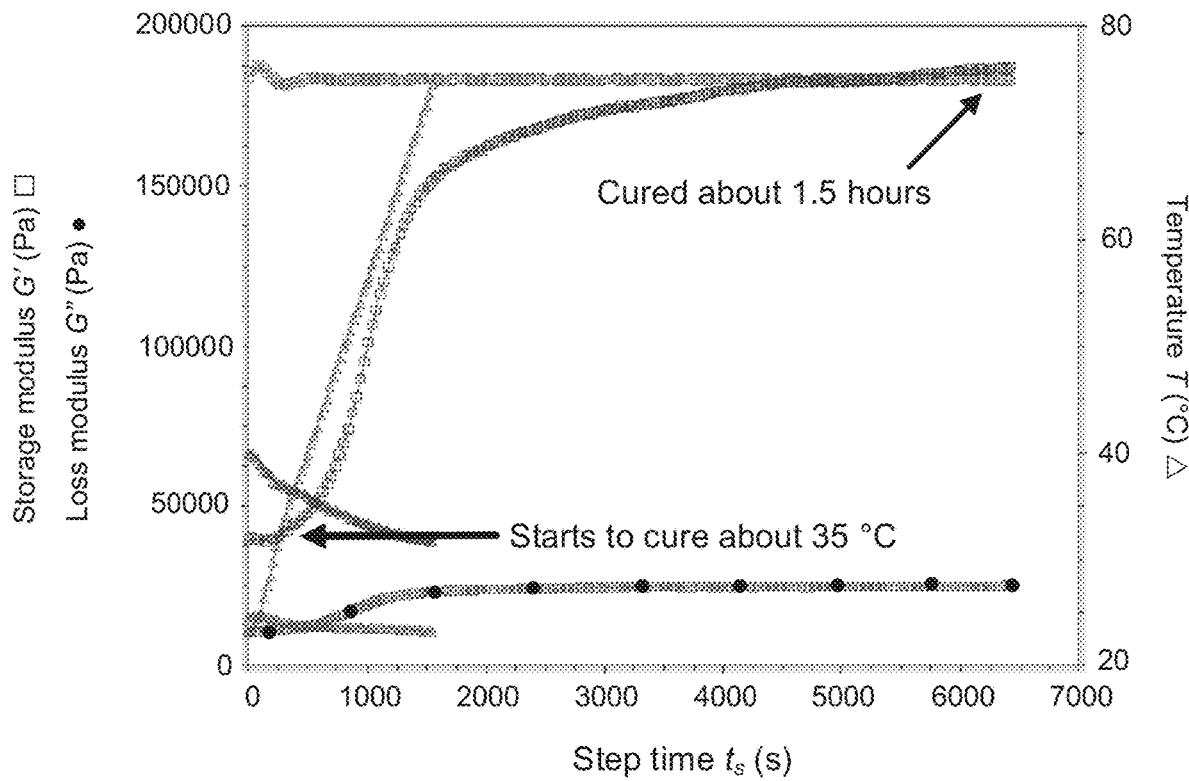
FIG. 5B is a cure profile of a transparent siloxane-based ink having thixotropic additive, according to one embodiment.

FIG. 5B shows the cure profile of the transparent ink of Example 1. The ink started to cure at about 35° C. (temperature depicted by Δ, right y-axis) over time (seconds (s) x-axis). The plot shows the Storage Modulus (G', left y-axis, □) over time during curing represented the formation of a network. The Loss Modulus (G", left y-axis, ●) was measured over time during curing and remained relatively constant. The ink was substantially cured by 30 minutes (1800 s) and completely cured by about 1.5 hours (5400 s).

Yield Stress Profile and Cure Profile of Example 2

The transparent siloxane-based ink of Example 2 was used to form the transparent 3D structure depicted in FIG. 3D, parts (a) and (b). FIG. 6A shows the yield stress of the transparent ink of Example 2 by plotting oscillation stress (δ, Pa, x-axis) of the Storage Modulus (G', y-axis Δ) and the Loss Modulus (G", y-axis □) values. Yield stress was defined as the oscillatory stress (3143 Pa) corresponding to a similar value of the measured storage modulus (G') and the loss modulus (G").

The storage modulus determines the yield stress of the material. The storage modulus is a measure of how solid the material is, and the loss modulus is a measure of how viscous the material is, such that when G" is greater than G', then the material should act like a solid at low stress, and then at sufficient stress (yield stress) the material starts to flow. Comparing the storage modulus of Example 1 to Example 2, G' of Example 2 is $3 \times 10^4$, whereas looking to the storage modulus G' of Example 1 (see FIG. 5A), G' is closer to $10^5$.

FIG. 6B shows the cure profile of the transparent ink of Example 2. The ink started to cure at about 35° C. (temperature depicted by Δ, right y-axis) over time (seconds (s)

x-axis). The plot shows the Storage Modulus (G', left y-axis, □) over time during curing and the Loss Modulus (G", left y-axis, ●) over time during curing. The ink was substantially cured by about 1.5 hours (5400 s).

In Use

Functional 3D printed transparent siloxane elastomer materials have a diverse range of applications and potential within the fields of materials engineering, bioengineering, and electronics. Through precise control over the deposition of highly-engineered viscoelastic inks in the form of continuous filaments, complex 3D architectures may be additively fabricated, layer-by-layer, to generate parts that are directly applicable to cutting-edge technologies, including aerospace and defense, microwave optics, supercapacitors, piezoelectrics, and mechanical metamaterials. In particular, 3D printed transparent siloxane material may be well suited to elastomeric optical material. By varying refractive index, various embodiments described herein may print 3D elastomeric lenses.

Various embodiments described herein may be applied to 3D engineered transparent biomedical devices (biocompatibility), microfluidics, metamaterials, flexible electronics, and optic systems. Additionally, the low temperature performance, down to negative 100° C., may be suitable to applications in extreme conditions such as space.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. An ink, comprising:
    a siloxane polymer having at least 13 mol. % diphenyl-siloxane content relative to the total mol. % of the siloxane polymer; and
    a filler, wherein the siloxane polymer has a defined diphenyl content predetermined to cause a refractive index of the siloxane polymer to be within about 5% of a refractive index of the filler.

2. The ink as recited in claim 1, wherein the diphenyl content is in a range of at least 13 mol. % to less than 18 mol. %.

3. The ink as recited in claim 1, wherein the siloxane polymer is a copolymer having dimethylsiloxane content.

4. The ink as recited in claim 1, wherein the filler includes fumed silica.

5. The ink as recited in claim 1, wherein the filler is present in the ink at about 5 wt. % to about 50 wt. % relative to the total weight of the ink.

6. The ink as recited in claim 1, further comprising a branched siloxane resin.

7. The ink as recited in claim 1, further comprising a crosslinking catalyst.

8. The ink as recited in claim 1, further comprising a rheology modifying additive.

9. The ink as recited in claim 1, wherein the ink is characterized as being transparent after curing.

10. The ink as recited in claim 1, wherein the siloxane polymer has a viscosity in a range of about 100 centistokes to about 50,000 centistokes.

11. A product, comprising:
    a transparent three-dimensional (3D) structure having physical characteristics of formation by additive manufacturing,
    wherein the structure includes a siloxane polymer having a refractive index and at least 13 mol. % diphenylsiloxane content relative to the total mol. % of the siloxane polymer, and a filler having a refractive index, wherein the siloxane polymer has a defined diphenyl content predetermined to cause the refractive index of the siloxane polymer to be about matching the refractive index of the filler.

12. The product as recited in claim 11, wherein the diphenyl content is in a range of at least 13 mol. % to less than 18 mol. %.

13. The product as recited in claim 11, wherein the siloxane polymer is a copolymer having dimethylsiloxane content.

14. The product as recited in claim 11, wherein the 3D structure is part of a microfluidic system.

15. The product as recited in claim 11, wherein the 3D structure includes an elastomeric lens.

16. A method, comprising:
    extruding an ink for forming a three-dimensional (3D) structure, the ink comprising:
    a siloxane polymer having at least 13 mol. % diphenyl-siloxane content relative to the total mol. % of the siloxane polymer, and
    a filler, wherein the siloxane polymer has a defined diphenyl content specifically tuned to cause a refractive index of the siloxane polymer to be about matching a refractive index of the filler, wherein the refractive indices are within about 5% of one another, the filler being present in the ink at about 5 wt. % to about 50 wt. %; and
    curing the 3D structure for forming a transparent product as a result of the refractive indices.

17. The method as recited in claim 16, wherein the diphenyl content is in a range of at least 13 mol. % to less than 18 mol. %.

18. The method as recited in claim 16, wherein the siloxane polymer is a copolymer having dimethylsiloxane content.

19. The method as recited in claim 16, wherein the ink is extruded by a direct ink writing device.

20. The method as recited in claim 16, wherein the curing is selected from the group of techniques consisting of: thermal curing, ultraviolet curing, peroxide curing, and moisture curing.

* * * * *